Figure 7:
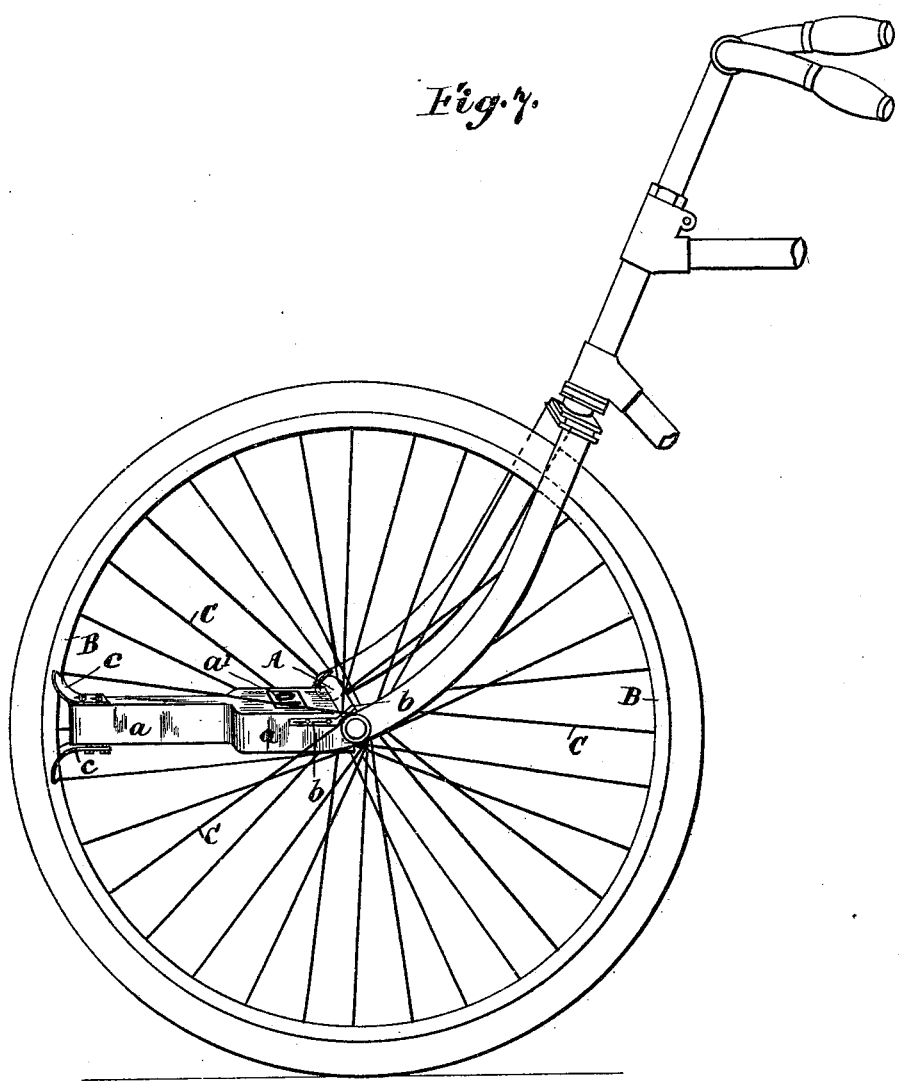

No. 636,844. Patented Nov. 14, 1899.
W. G. C. REED.
SPEED INDICATOR FOR VELOCIPEDES, &c.
(Application filed May 22, 1899.)
(No Model.) 3 Sheets—Sheet 1.
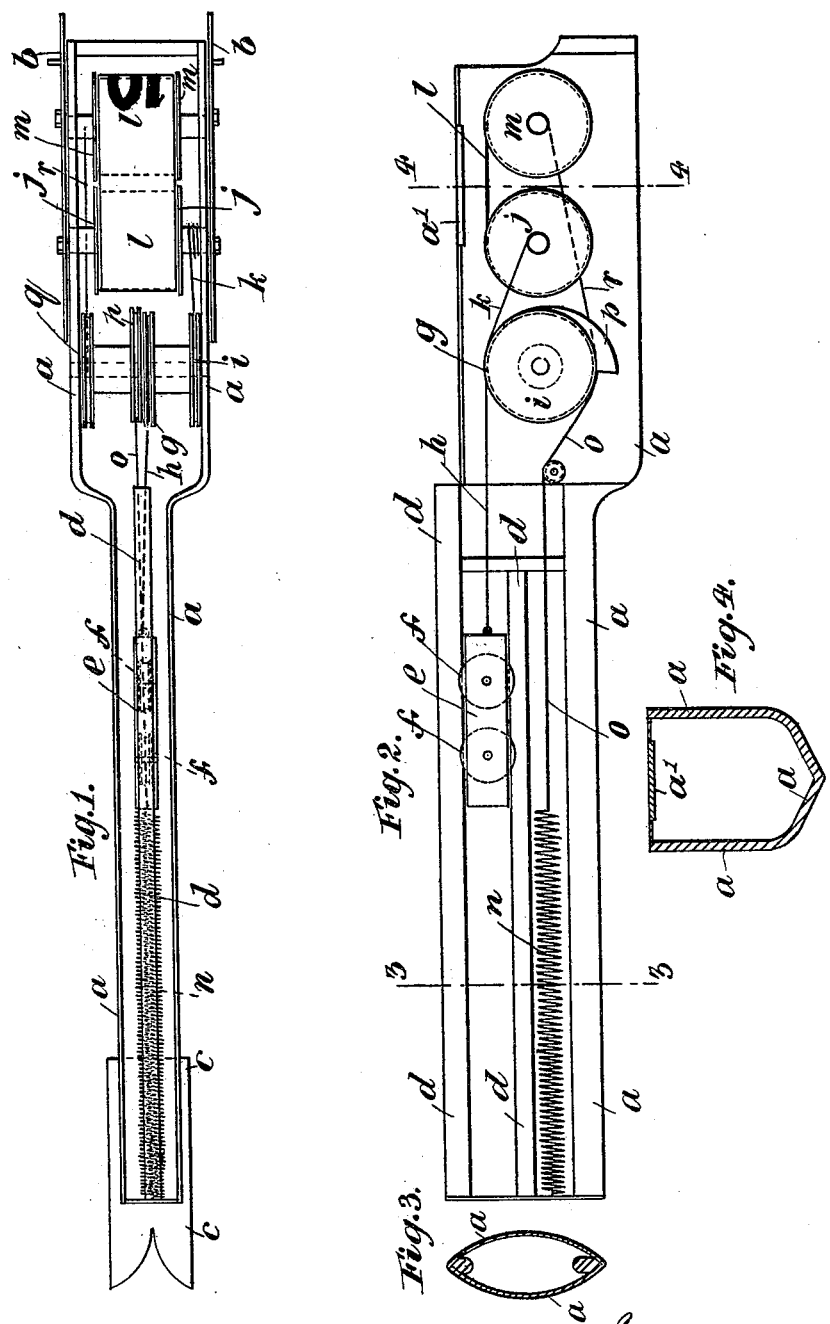

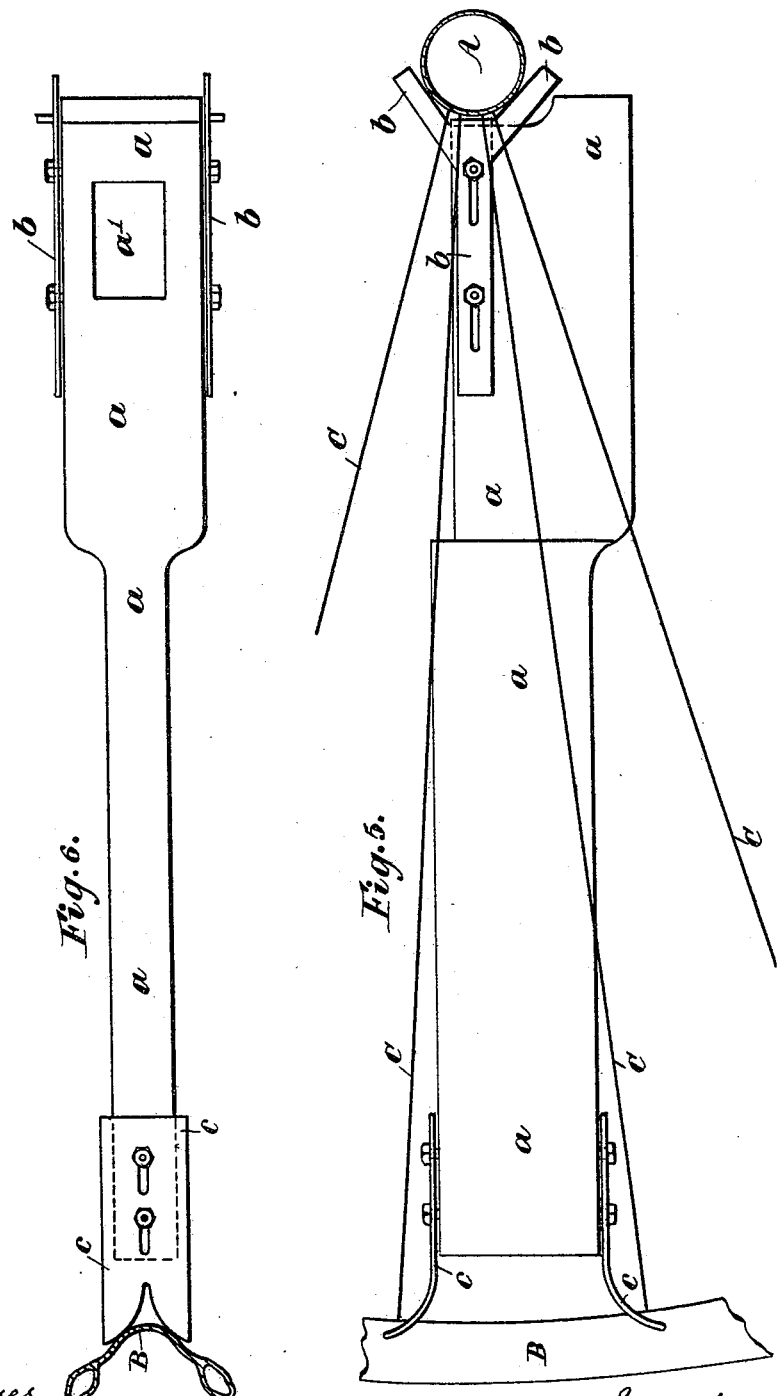

No. 636,844. Patented Nov. 14, 1899.
W. G. C. REED.
SPEED INDICATOR FOR VELOCIPEDES, &c.
(Application filed May 22, 1899.)

(No Model.) 3 Sheets—Sheet 3.

UNITED STATES PATENT OFFICE.

WILLIAM G. C. REED, OF LONDON, ENGLAND.

SPEED-INDICATOR FOR VELOCIPEDES, &c.

SPECIFICATION forming part of Letters Patent No. 636,844, dated November 14, 1899.

Application filed May 22, 1899. Serial No. 717,816. (No model.)

*To all whom it may concern:*

Be it known that I, WILLIAM GEORGE CHARLES REED, a subject of the Queen of Great Britain, residing at Winchmore Hill, London, in the county of Middlesex, England, have invented certain new and useful Improvements in or Connected with Speed-Indicators for Velocipedes, Motor-Cars, and other Vehicles, of which the following is a full, clear, and exact description, and for which I have made application for patent in Great Britain, No. 22,687, dated October 28, 1898.

The invention relates to that class of speed-indicator which is dependent for its action on centrifugal force acting to throw a weight outward against the action of a spring, and thus giving motion to suitable indicating means; and the invention consists principally in locating said speed-indicator within, say, the front wheel of a bicycle or within another wheel of a like construction, or said indicator may be otherwise attached to the wheel and revolve with it.

The invention is illustrated in the accompanying drawings, in which—

Figure 1 is a plan of the apparatus with the top removed. Fig. 2 is an elevation of the same with the side removed. Fig. 3 is a cross-section of the case or cover on the line 3 3 of Fig. 2. Fig. 4 is a cross-section of the case or cover on the line 4 4 of Fig. 2. Fig. 5 shows the apparatus in elevation attached to the wheel of a velocipede. Fig. 6 is a plan of the apparatus complete. Fig. 7 is a view of the front part of a bicycle with an apparatus made according to this invention attached to the front wheel.

In carrying the invention into effect I construct a suitably-shaped frame $a$ of such dimensions that it can be placed between the spokes of a wheel and extend from the hub A to or nearly to the rim B. The frame $a$ is provided at the one end with a pair of forks $b$ to fit against the hub A and at the other end with a pair of adjustable spring-forks $c$ to press against the rim B, and two spokes C. By these means the apparatus is connected firmly to the wheel. In this frame $a$ I form a pair of guides $d$, within or upon which a weight $e$, provided with groove wheels or rollers $f$, is arranged to run freely. This weight $e$ is attached to a pulley $g$ by means of a cord or chain $h$, which may pass one or more times around said pulley $g$. This pulley $g$ is connected rigidly to and forms part of the pulley $i$, which latter is connected to the hub of the pulley $j$ by means of the cord $k$. By this means the motion of the pulley $j$ is greater than that of the pulleys $g$ and $i$.

One end of the tape or band $l$, upon which the figures indicating the speed are printed, is attached to the pulley $j$, the other end of said tape or band $l$ passing around and being attached to a suitable pulley $m$.

A spring $n$ is attached to the indicator-frame $a$ in a suitable position, and to this spring $n$ is attached one end of a cord or chain $o$, the other end of which is attached to a "fusee" or scroll wheel $p$ to equalize the motion of the tape. This fusee or scroll wheel $p$ is attached to and moves with the pulley $q$, which latter is connected to the hub of the pulley $m$ by means of the cord or chain $r$.

The apparatus, as shown, is inclosed in the case or frame $a$, provided with a glazed opening $a'$, through which one or more numbers on the tape or band $l$ can be seen and the speed of the vehicle thereby ascertained in miles or in any other units of measurement. The figures are preferably shown in bright silver or gold upon a black ground.

The apparatus being arranged substantially as indicated in Figs. 5 and 7 and the wheel being revolved, centrifugal force will throw out the weight toward the rim more or less, according to the speed, and it, dragging out the cord or chain $h$, will cause the indicating-band pulleys to revolve, and thus move the said band proportionately to the speed, the rate of speed being read from said band as it is thus moved. When the rider wishes to ascertain the speed at which he is traveling, he places his head to either side of the front wheel, so that the rim and tire do not obstruct his vision. The spokes being so thin cause practically no obstruction to the clear reading of the apparatus. It will be observed that the opening $a'$, through which the figures are seen, is situated close to the hub. Consequently this part of the apparatus is moving comparatively slowly, and as the figure is seen with each revolution of the wheel in the same relative position to the wheel of the machine and to the eye of the rider it can easily be read.

What I claim as my invention, and desire to secure by Letters Patent, is—

1. In a speed-indicator, for a velocipede or other vehicle, the combination of a case, having an opening through which the figures on a tape can be seen, and means for attaching one end of the case to the hub of a wheel and the other end thereof to the rim, with a tape arranged in said case and connected with and actuated by a weight which responds to the centrifugal force of the revolving wheel, substantially as set forth.

2. In a speed-indicator, for a velocipede or other vehicle, the combination of a case, having a glazed opening through which a portion of the interior may be seen, with a pair of adjustable spring-forks at one end adapted to engage the rim and adjacent spokes of a wheel, and a pair of rigid forks at the other end adapted to engage the hub of the wheel, substantially as set forth.

3. In a speed-indicator for a velocipede or other vehicle, the combination of a case having means for attaching it to a wheel, a weight running on guides in said case, a pulley to which such weight is connected by a flexible connection, a pulley receiving an increased motion and to which one end of a tape or band having indicating-figures thereon is attached, a pulley to which the other end of the tape or band is connected, and a spring acting on said latter pulley in a contrary direction to that of the centrifugal force of the weight, substantially as herein set forth.

4. In a speed-indicator for a velocipede or other vehicle, the combination of a case having means for attaching it to a wheel, a weight running on guides in said case, a pulley to which such weight is connected by a flexible connection, a pulley receiving an increased motion and to which one end of a tape or band having indicating-figures thereon is attached, a pulley to which the other end of the tape or band is connected and a spring acting on said latter pulley in a contrary direction to that of the centrifugal force of the weight through the intervention of a fusee or scroll wheel, substantially as herein set forth.

In testimony whereof I affix my signature in presence of two witnesses.

W. G. C. REED.

Witnesses:
   WM. GIRLING,
   CHAS. ROCHE.